United States Patent
Jonishi et al.

(10) Patent No.: US 8,213,945 B2
(45) Date of Patent: Jul. 3, 2012

(54) MOBILE COMMUNICATION SYSTEM, AND METHOD FOR CONTROLLING CHANNEL CONNECTION AND CONTROL STATION IN MOBILE COMMUNICATION SYSTEM

(75) Inventors: Asuka Jonishi, Fujisawa (JP); Makoto Mita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 192 days.

(21) Appl. No.: 12/825,921

(22) Filed: Jun. 29, 2010

(65) Prior Publication Data
US 2011/0034196 A1 Feb. 10, 2011

(30) Foreign Application Priority Data
Aug. 4, 2009 (JP) ................................. 2009-181186

(51) Int. Cl.
*H04W 72/00* (2009.01)
(52) U.S. Cl. ........ 455/450; 455/436; 455/437; 455/451; 455/456.1; 370/310; 370/331; 370/332; 370/333
(58) Field of Classification Search ....... 455/436–456.1; 370/310, 331–333
See application file for complete search history.

(56) References Cited

U.S. PATENT DOCUMENTS

| | | | |
|---|---|---|---|
| 2001/0044306 A1* | 11/2001 | Shimono et al. | 455/441 |
| 2002/0137515 A1* | 9/2002 | Igarashi et al. | 455/436 |
| 2004/0097234 A1* | 5/2004 | Rajkotia et al. | 455/442 |
| 2008/0102853 A1* | 5/2008 | Kagimoto et al. | 455/453 |
| 2009/0318156 A1* | 12/2009 | Ode et al. | 455/438 |
| 2010/0267387 A1* | 10/2010 | Stephens | 455/436 |

FOREIGN PATENT DOCUMENTS
JP 2007-318295 12/2007
* cited by examiner

*Primary Examiner* — Fayyaz Alam
(74) *Attorney, Agent, or Firm* — Antonelli, Terry, Stout & Kraus, LLP.

(57) ABSTRACT

A mobile communication system can predict a temporary access concentration to a particular wireless base station, select an appropriate wireless base station and assign down channels for each mobile terminal. In respective wireless base stations, switching scheduling to a channel congestion avoidance mode is performed by checking the obtained use history of respective wireless base stations to determine the periodicity regarding the channel congestion of the respective wireless base stations. Once switched to the channel congestion avoidance mode, a wireless base station for each mobile terminal is selected based on idle channel conditions of surrounding wireless base stations and moving direction characteristics of mobile terminals currently connected to the wireless base station. The only down channel of each mobile terminal is connected to the selected wireless base station, and the wireless communication is established.

8 Claims, 8 Drawing Sheets

FIG.6

| BASE STATION 22 | | HANDOFF DESTINATION BASE STATION | | | |
|---|---|---|---|---|---|
| | | 21 | 23 | ... | 2N |
| HANDOFF SOURCE BASE STATION | 21 | $P_{11} * T_1$ | $P_{12} * T_2$ | ... | $P_{1N} * T_N$ |
| | 23 | $P_{21} * T_1$ | $P_{22} * T_2$ | ... | $P_{2N} * T_N$ |
| | ⋮ | ⋮ | ⋮ | | ⋮ |
| | 2M | $P_{M1} * T_1$ | $P_{M2} * T_2$ | ... | $P_{MN} * T_N$ |

MOBILE COMMUNICATION SYSTEM, AND METHOD FOR CONTROLLING CHANNEL CONNECTION AND CONTROL STATION IN MOBILE COMMUNICATION SYSTEM

INCORPORATION BY REFERENCE

The present application claims priority from Japanese application JP 2009-181186 filed on Aug. 4, 2009, the content of which is hereby incorporated by reference into this application.

BACKGROUND OF THE INVENTION

This invention relates to a mobile communication technology and particularly to a technology for controlling channel connections between mobile terminals and wireless base stations.

In a mobile communication system, a mobile terminal receives radio waves from a plurality of surrounding wireless base stations, and selects one of them with the greatest radio field strength to establish a wireless channel connection. So, when a number of mobile terminal users gather around one wireless base station, wireless accesses from the mobile terminal users concentrate in the wireless base station, resulting in degrading communication quality of individual wireless channels. When such a problem happens, each carrier normally adds new wireless base stations to respond to the problems.

As a prior art document on a channel connection technology in the mobile communication system, a patent document JP-A-2007-318295 is cited. The wireless communication system of JP-A-2007-318295 comprises a control station connecting to a plurality of wireless base stations and mobile stations performing wireless communication with the wireless base stations. In the system of JP-A-2007-318295, a mobile station receives an idle signal representing idle channels from the control station, detects the idle channels and selects the detected idle channels to make a wireless channel connection. The idle signal includes information on idle up and down channels, and the mobile station selects an up channel and a down channel of good quality based on the information on the idle up channels and down channels, respectively.

Since degrading communication quality causes users to feel stresses, there need to be some solutions to avoid the channel congestion of the wireless base stations. One of the solutions, adding wireless base stations, requires a large cost and cannot be said to be an efficient solution where the channel congestion is temporary. In the case where a temporary congestion occurs, it is necessary to solve the congestion only then it occurs. It is also desired that the congestion can be predicted and avoided in advance but not after it has occurred.

A method for selecting a channel of good quality may be used in the wireless communication system of JP-A-2007-318295, as the method for avoiding the channel congestion. This method selects a wireless base station for up and down channels only based on the information on idle channels. In the case where the mobile station moves in a direction opposite to the selected wireless base station, the communication is disrupted.

Further, since power consumption is an important performance indicator for a mobile terminal such as a cell phone, it is not desirable from the viewpoint of power consumption that the mobile terminal moves away from the wireless base station to which the mobile terminal is connected via the up channels.

Further, since a mobile station selects the wireless base station to which the mobile station is connected in the method of JP-A-2007-318295, the method cannot be implemented using the existing mobile stations. To realize the method of JP-A-2007-318295, it is necessary for all mobile stations owned by the users to have an additional function.

This invention has been accomplished to solve these problems, and it is an object of this invention to predict that the temporary congestion occurs and to avoid it in advance without adding new wireless base stations.

It is also an object of this invention to avoid the channel congestion taking into consideration the mobility of mobile terminals.

SUMMARY OF THE INVENTION

To solve the above problem, this invention provides A mobile communication system comprising a plurality of wireless base stations to communicate with mobile terminals via wireless channels and a control station connecting to the plurality of wireless base stations to control the plurality of wireless base stations, wherein the control station regularly collects from the plurality of wireless base stations congestion information of the wireless channels in respective wireless base stations and movement information of mobile terminals;

prepares schedule information based on statistical processing results of the collected congestion information, the schedule information being used to switch a wireless channel connection control mode of respective wireless base stations; and, in the case of controlling a wireless base station in a channel congestion avoidance mode according to the prepared schedule information, based on the congestion information of wireless base stations adjacent to the wireless base station and the movement information of the wireless base station, selects a wireless base station as a down channel connection destination from among the adjacent wireless base stations for each mobile terminal currently connected to the wireless base station and for each mobile terminal about to be connected to the wireless base station, notifies each mobile terminal of the selected wireless base station, and controls the wireless base station so that each mobile terminal is connected via a down channel to the selected wireless base station.

Specifically, the control station prepares the schedule information, by regularly collecting throughput information of the plurality of wireless base stations as the congestion information of the wireless channels and performing statistical processing on the collected throughput information for each day of week and for each time zone to determine the periodicity that the wireless channels in each of the plurality of the wireless base stations is congested.

The movement information of mobile terminals in respective wireless base stations represents a handoff source wireless base station and a handoff destination wireless base station; and the control station, based on the movement information, calculates for respective wireless base stations a probability that mobile terminals move to each of all wireless base stations adjacent to the wireless base station in order to determine movement characteristics of mobile terminals, and, based on the movement characteristics, selects a wireless base station to be notified to each mobile terminal.

According to this invention, in the case where temporary access concentration occurs on a wireless base station, it is possible to predict the access concentration in the wireless base station in advance and control each mobile terminal to connect it to an appropriate wireless base station without adding wireless base stations. Further, it is possible to secure the communication quality of down channels without increasing power consumption of mobile terminals. Further, it is unnecessary to specially modify the existing wireless base stations or mobile terminals.

Other objects, features and advantages of the invention will become apparent from the following description of the embodiments of the invention taken in conjunction with the accompanying drawings.

BRIEF DESCRIPTION OF THE DRAWINGS

FIG. 6 shows a configuration example of a moving direction probability table managed by a control station.

DESCRIPTION OF THE EMBODIMENTS

Figure 1:
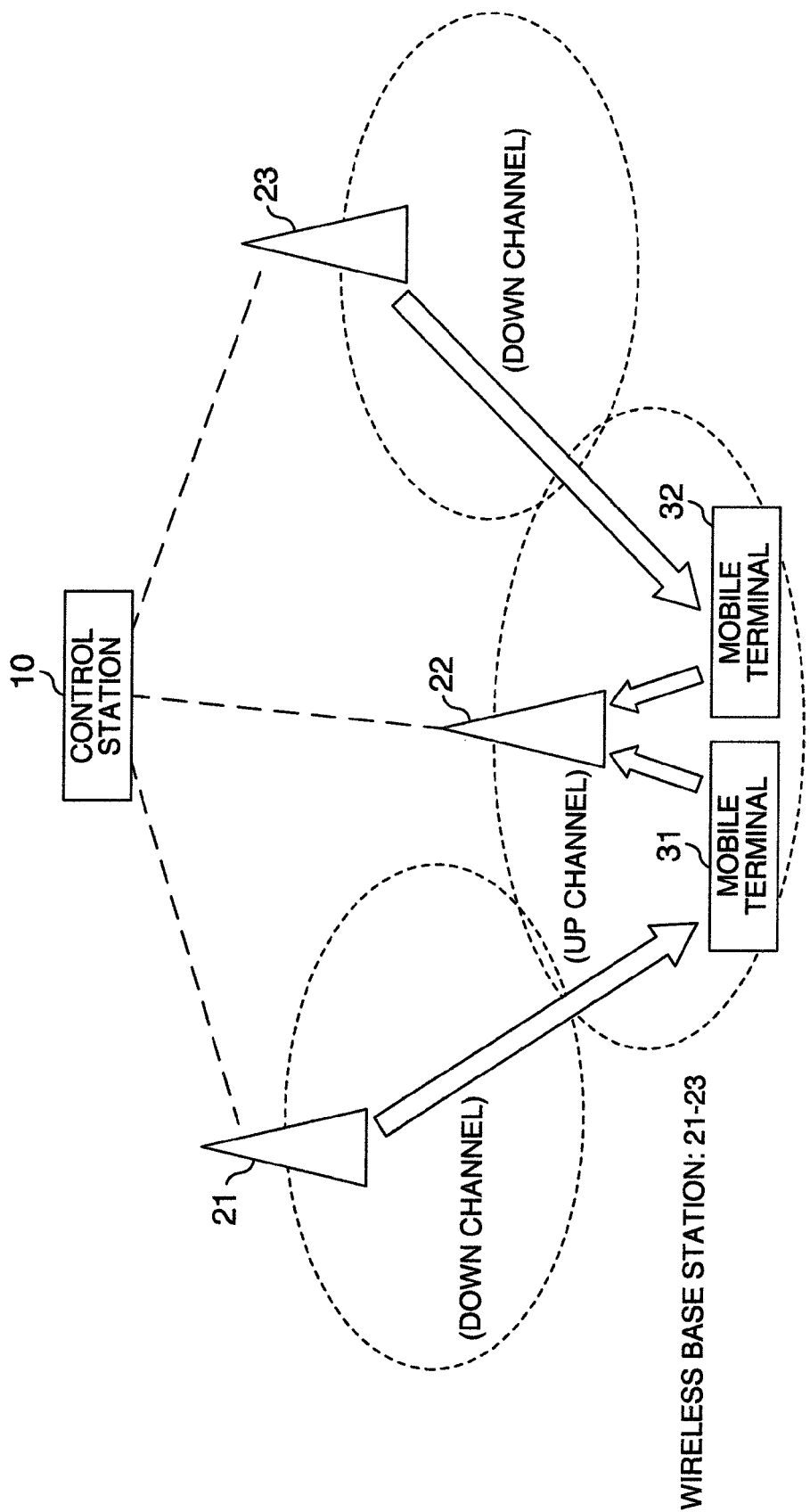
FIG. 1 shows a configuration of a mobile communication system as one embodiment of this invention.

One embodiment of this invention will be described in detail by referring to the drawings.

First, a configuration of a mobile communication system to which this invention is applied will be explained.

FIG. 1 is a block diagram showing a configuration of a mobile communication system in one embodiment of this invention.

As shown in FIG. 1, the mobile communication system comprises a plurality of mobile terminals 31 and 32, a plurality of wireless base stations 21, 22 and 23 that connect to these mobile terminals to communicate with them wirelessly via wireless channels, and a control station 10 that connects to the plurality of wireless base stations to control them.

First, the channel connection control method of this invention will be outlined. In FIG. 1, the control station 10 is connected to a plurality of wireless base stations 21-23 and periodically collects and stores throughput values from each wireless base station. Here, for example, the collected throughput values may be average throughput values of all mobile terminals connected to each wireless base station. In this invention, a throughput value is used as an indicator representing channel congestion conditions. The throughput value degrades according as the channel gets congested, and therefore can be used as an indicator representing the channel congestion conditions.

For respective wireless base stations, based on handoff history from other wireless base stations to the respective wireless base stations and from the respective wireless base stations to other wireless base stations, the control station determines and holds statistical data of handoff sources and handoff destinations of mobile terminals connected to the respective base station. The control station 10 performs statistical processing on throughput values collected from the respective wireless base stations to check the congestion characteristics of wireless channels of the respective wireless base stations. In a time zone when channels in the respective wireless base stations are expected to be congested, a channel connection control mode of the respective wireless base stations is switched to a channel congestion avoidance mode.

An example case will be explained where the control station 10 switches the channel connection control mode of the wireless base station 22 to the channel congestion avoidance mode when accesses are expected to concentrate in the wireless base station 22. Based on the information on throughput values collected from the wireless base stations 21 and 23 other than the wireless base station 22 and the moving direction probability information of the wireless base station 22 described below, the control station 10 assigns, as a wireless base station for down channel, the wireless base stations 21 and 23 to the mobile terminals 31 and 32, respectively. The mobile terminal 31 is connected via downward wireless channel to the wireless base station 21 while the mobile terminal 31 keeps the upward wireless channel connecting to the wireless base station 22. Similarly, the mobile terminal 32 is connected via the downward wireless channel to the wireless base station 23 while the mobile terminal 32 keeps the upward wireless channel connecting to the wireless base station 22.

Next, checking channel congestion conditions to predict in advance degrading communication quality due to the access concentration and switching scheduling to the channel congestion avoidance mode will be explained by referring to FIGS. 2 and 3.

Figure 2:
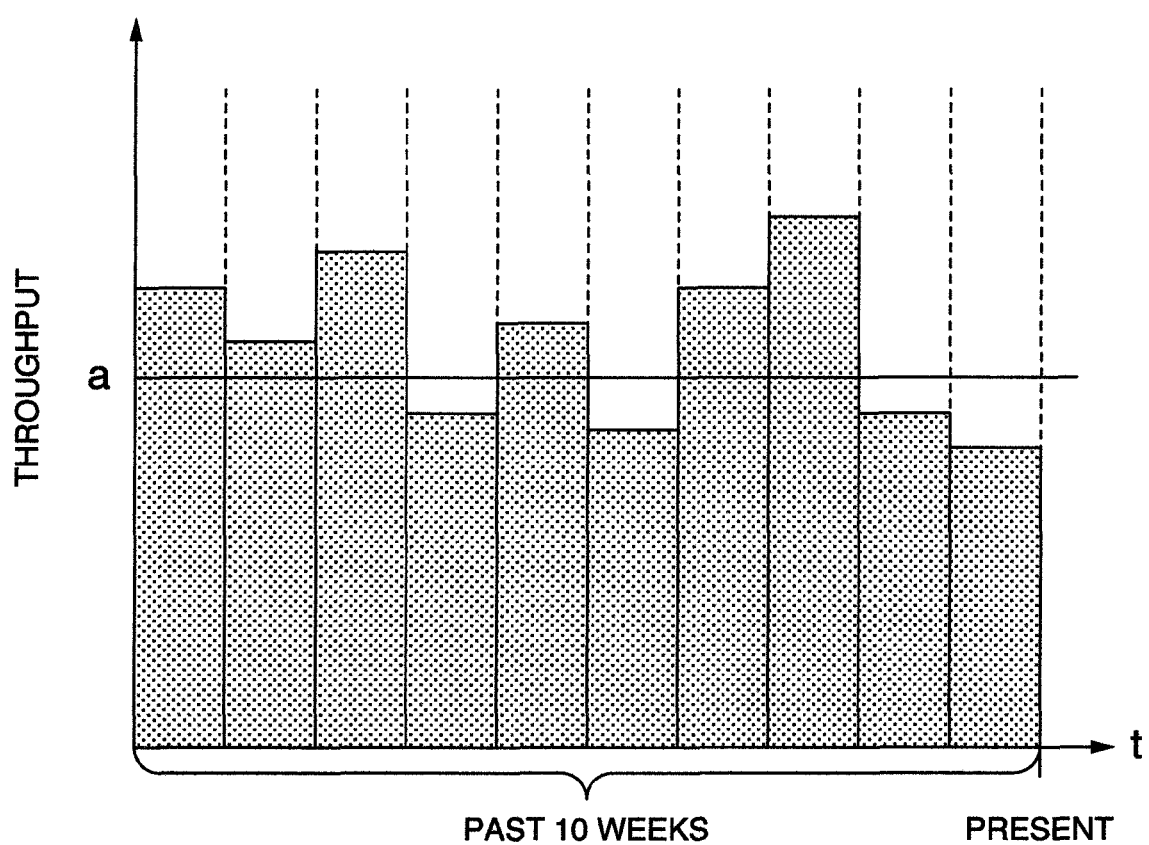
FIG. 2 shows data of throughput values in a wireless base station for a past predetermined period.

FIG. 2 shows data on throughput values of a wireless base station in a past predetermined period.

Figure 3:
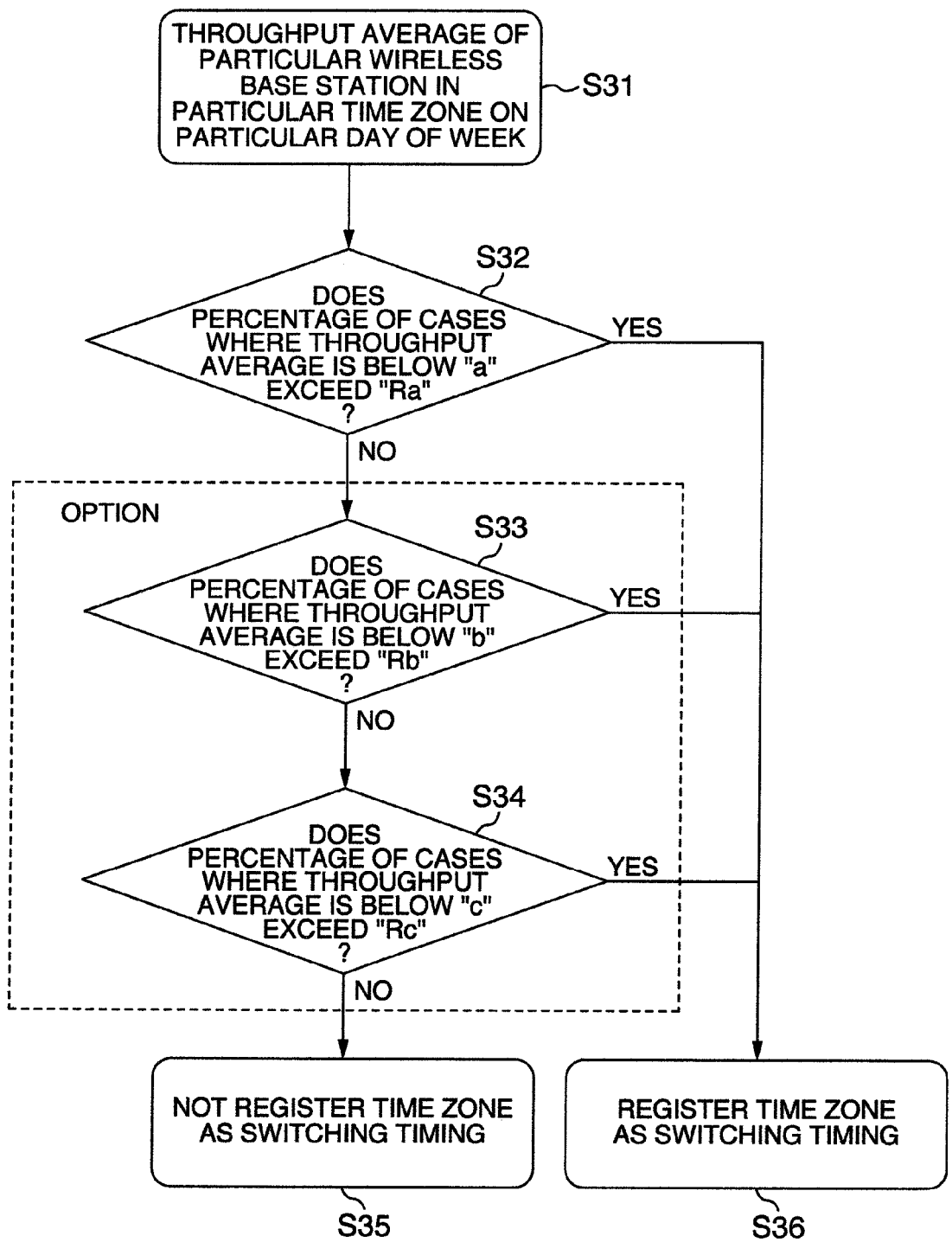
FIG. 3 is a flowchart showing a scheduling method for switching to the channel congestion avoidance mode in one embodiment of this invention.

FIG. 3 is a flowchart showing a scheduling method for switching to the channel congestion avoidance mode in one embodiment of this invention.

For the area in which accesses concentrate, adding wireless base stations is an effective solution. But, for the area in which accesses concentrate on a particular day of week or in a particular time zone, it is efficient to avoid access concentration only in the time zone when accesses are expected to concentrate. For example, at ballparks or concert venues, the number of cell phone users and therefore the number of accesses are few on days when there are no games or concerts. But, on the day when an event is scheduled to be performed and particularly before and after a game or concert, accesses are expected to concentrate. In schools, accesses are expected to be few during class but to increase during recess, and in railway stations, accesses are expected to concentrate during commute time to work and school.

The access concentration in schools during recess and in railway stations during commute time is considered to occur in particular time zones on five weekdays. So, the control station can analyze the statistically processed data of throughput values of individual wireless base stations, and thereby determine a wireless base station likely to be congested and the periodicity of the day of week and time zones when the wireless base station is likely to be congested, and automatically switch to the channel congestion avoidance mode.

In this embodiment, if the percentage of the cases where an average throughput in a particular time zone on a particular day of week for the past predetermined period is lower than a threshold "a" (referred to as a "throughput threshold") exceeds a predetermined percentage "Ra" (referred to as a throughput reduction rate threshold), the particular time zone on the day of week is registered as a timing to switch to the channel congestion avoidance mode so as to automatically perform switching scheduling to the channel congestion avoidance mode in the time zone on the day of week to avoid the channel congestion in advance.

FIG. 2 shows data example of throughput averages for 13:00-14:00 on Mondays in a wireless base station, with the horizontal axis representing the time of the past 10 weeks before present. In this example case, if the throughput reduction rate threshold "Ra" for the throughput threshold "a" is 50%, the percentage of the cases where the throughput average is below the throughput threshold "a" is 40%, and does not exceed the throughput reduction rate threshold Ra, so that 13:00-14:00 on Mondays is not registered in the schedule as a timing to switch to the channel congestion avoidance mode.

The throughput reduction rate threshold "Ra" for the past predetermined period varies depending on the throughput threshold "a". For example, the smaller the throughput threshold "a", the smaller the throughput reduction rate threshold "Ra" is considered to become. Having the small throughput threshold "a" means a significant reduction in the throughput, and it is desired that such a dramatic reduction in throughput be avoided as much as possible. So, setting a small throughput reduction rate threshold "Ra" to register the time zone as a timing for mode switching makes it possible to automatically avoid the throughput degradation even if few access concentration events has occurred in the past. The information on the timing when the channel congestion occurs is managed as schedule information on the channel connection control by the control station 10.

FIG. 3 is a flowchart showing a scheduling method for switching to the channel congestion avoidance mode.

In the statistical processing described above (step 31), the throughput average in a particular wireless base station is obtained in a particular time zone on a particular day of week. In the next step 32, it is determined whether or not the percentage of the cases where the throughput average in the wireless base station in a particular time zone on a particular day of week for the past predetermined period obtained as a result of the statistical processing is below the throughput threshold "a" exceeds the throughput reduction rate threshold "Ra". If the percentage exceeds the throughput reduction rate threshold "Ra", the time zone is registered in the schedule information of the control station 10 as a switching timing to the channel congestion avoidance mode (step 36). If the percentage does not exceed the throughput reduction rate threshold "Ra", the time zone is not registered as the switching timing to the mode (step 35). As in optional steps 33 and 34 of FIG. 3, a plurality of pairs of the throughput threshold and the throughput reduction rate threshold for the past predetermined period may be set to enhance precision. In that case, the smaller the throughput threshold "a" is, the smaller the throughput reduction rate threshold "Ra" will become as described above, and thus, if the throughput thresholds "a", "b" and "c" are "a"<"b"<"c", the throughput reduction rate thresholds Ra, Rb and Rc are considered to be "Ra"<"Rh"<"Rc".

Depending on the setting, even at a timing that is not registered in the schedule information on a channel congestion avoidance mode switching, it is also possible to control a wireless base station whose traffic has suddenly increased so as to quickly switch to the channel congestion avoidance mode. For example, it is considered to control wireless base stations in ballparks and concert venues to switch to the channel congestion avoidance mode.

Next, an algorithm to select a wireless base station for down channel when switching to the channel congestion avoidance mode will be explained in detail by referring to FIGS. 4 to 7.

First, to select a wireless base station for down channel, the control station 10 needs to check idle channel conditions of surrounding wireless base stations. The control station collects and holds throughput values of respective wireless base stations, which are updated every predetermined period. Smaller updating interval unit such as five or one minute makes it possible to more appropriately check idle channel conditions. When selecting a wireless base station for down channel, a normalized throughput value of a wireless base station $2n$ is defined as a normalized throughput value "Tn". The higher the throughput is or the more idle channels there are, the greater the normalized throughput value "Tn" will become.

Further, there is a case where a mobile terminal locating in the area of a wireless base station in a channel congestion avoidance mode moves from the area of the wireless base station to the area of a neighboring wireless base station. At this case, a destination wireless base station to which the mobile station moves can be predicted, and if the destination wireless base station is selected as a wireless base station for down channel, an efficient handoff is possible. Considering that the moving direction of a mobile terminal connected to the wireless base station has characteristics depending on the location of the wireless base station and, this invention is characterized in that, a destination wireless base station for down channel is selected using the characteristics in the channel connection control at congestion times. An example is described below.

Figure 4A:
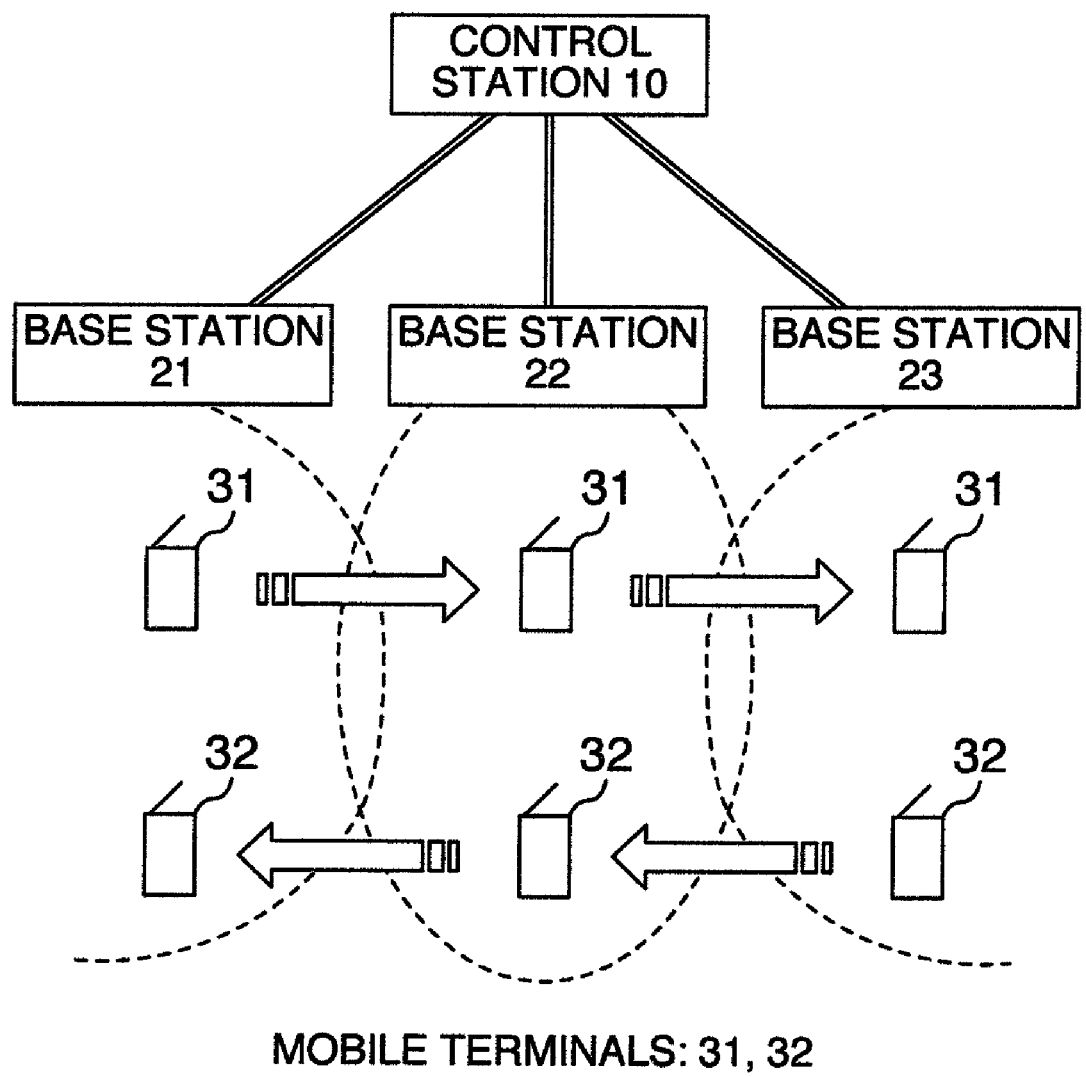
FIG. 4A shows an example of moving mobile terminals.

FIG. 4A shows an example of moving mobile terminals.

The figure shows an example of moving mobile terminals among wireless base stations installed near highways and railways. The mobile terminal 31 connected to the wireless base station 22 performs a handoff from the wireless base station 21 to the wireless base station 22, and then to the wireless base station 23. The mobile terminal 32 conversely performs a handoff from the wireless base station 23 to the wireless base station 22, and then to the wireless base station 21. In the area such as highways and railways where mobile terminals often move in one direction, the mobile terminals that have performed a handoff from the wireless base station 21 are considered to mostly perform a handoff to the wireless base station 22, and conversely the mobile terminals that have performed a handoff from the wireless base station 23 are considered to mostly perform a handoff to the wireless base station 21.

Figure 4B:
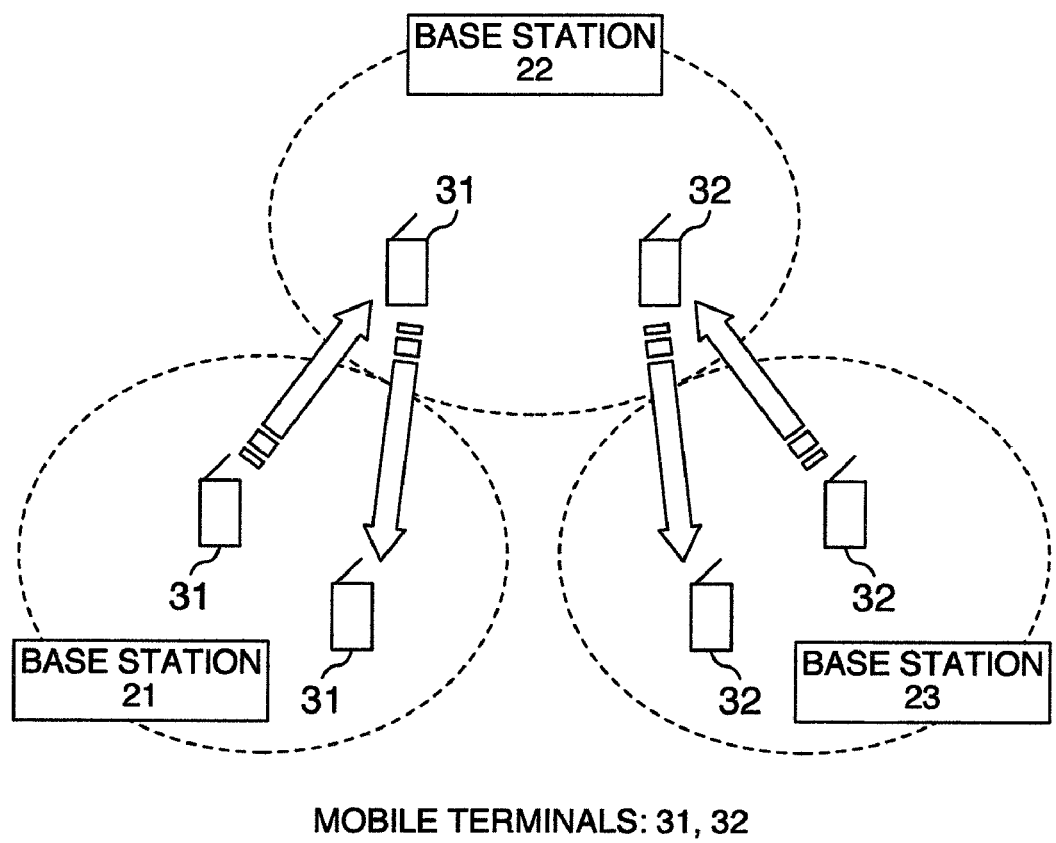
FIG. 4B shows another example of moving mobile terminals.

FIG. 4B shows another example of moving mobile terminals.

This figure shows an example of moving mobile terminals among wireless base stations installed near ballparks and concert venues. Mobile terminal users gathering in ballparks and concert venues are very likely to move back in directions opposite to the directions in which they have come. That is, the mobile terminals that have performed a handoff from the wireless base station 21 mostly return to the wireless base station 21, while the mobile terminals that have performed a handoff from the wireless base station 23 mostly return to the wireless base station 23.

To check the moving direction characteristics for each wireless base station, the control station 10 holds a set of data of handoff source wireless base station and handoff destination wireless base station for the past predetermined period for each mobile terminal connected to each wireless base station. Based on the data of handoff source and handoff destination for the past predetermined period, a probability that the handoff source is a wireless base station $2m$ and the handoff destination is a wireless base station $2n$ is defined as a moving direction probability "Pmn". That is, the moving direction probability "Pmn"=(the number of mobile terminals that have performed a handoff from the wireless base station $2m$, and then a handoff to the wireless base station $2n$)/(the total number of mobile terminals that have performed a handoff from the wireless base station $2m$).

Figure 5:
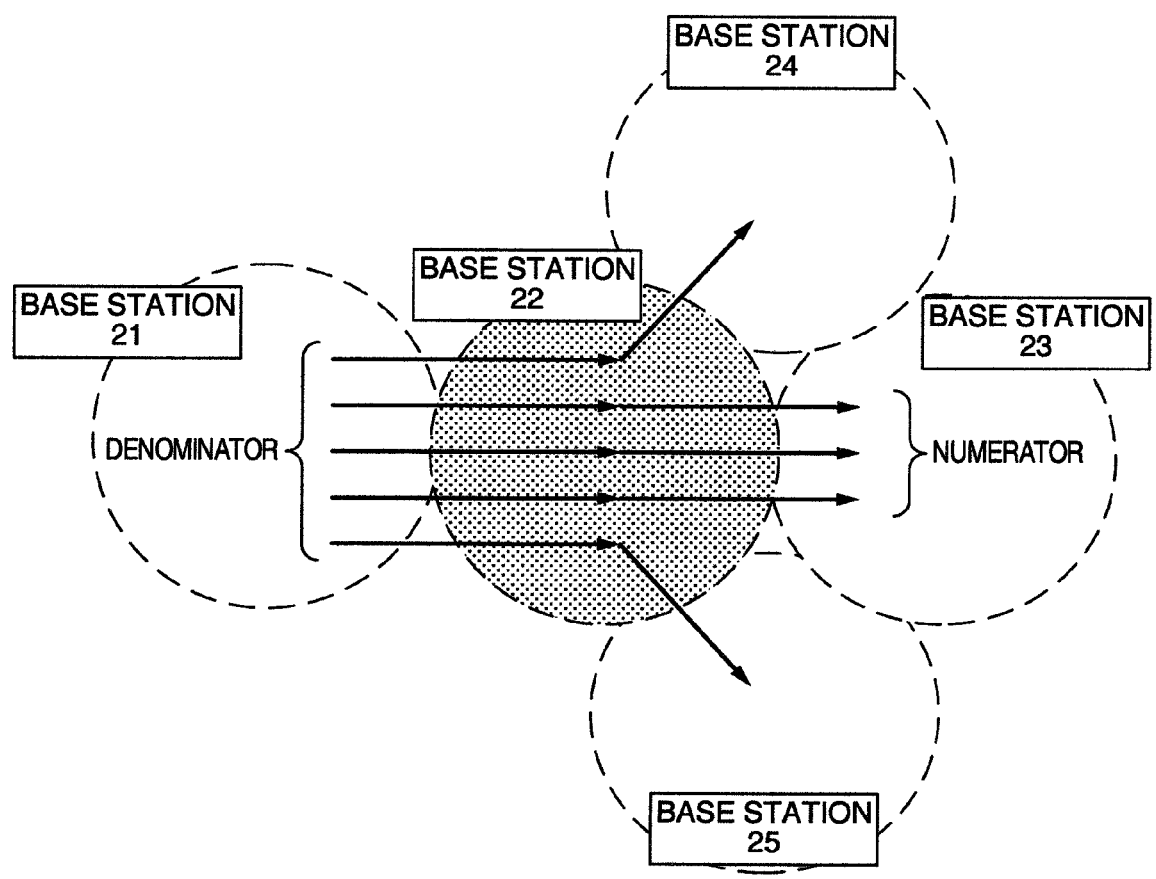
FIG. 5 illustrates a method for calculating the moving direction probability of mobile terminals.

FIG. 5 illustrates a method for calculating the moving direction probability of mobile terminals.

Here it will be explained that the method calculates a moving direction probability P13 in the wireless base station 22 for example (a probability that a mobile terminal performs a handoff from the wireless base station 21 to the wireless base station 22, and then from the wireless base station 22 to the wireless base station 23). At this time, the total of mobile terminals that have made a handoff from the wireless base station 21 to the wireless base station 22 is five, three ones of which have performed a handoff to the wireless base station 23, and so the moving direction probability P13=0.6. This indicates that the greater the value of the moving direction probability "Pmn" is, the higher the possibility will become that the mobile terminal that has performed a handoff from the wireless base station $2m$ to the wireless base station 22 performs a handoff to the wireless base station $2n$.

By using the above-defined normalized throughput value "Tn" representing the throughput values of surrounding wireless base stations and moving direction probability "Pmn" representing the moving direction characteristics of the wireless base station 22 (characteristics representing which surrounding wireless base station a mobile terminal connected to the wireless base station 22 is likely to move to), the control station 10 manages a table for each wireless base station.

FIG. 6 shows a configuration example of the moving direction probability table managed by the control station.

FIG. 6 shows a table of the wireless base station 22 as an example of the moving direction probability table managed by the control station 10. The higher the possibility becomes that the wireless base station $2n$ is idle and that a mobile terminal performs a handoff to the wireless base station $2n$, the greater, a product "Pmn"*"Tn" of a moving direction probability "Pmn" and a normalized throughput value "Tn", becomes. That is, by calculating the product of the moving direction probability "Pmn" and the normalized throughput value "Tn", wireless base stations for down channel can be selected taking into consideration the idle channel conditions and the handoff destination probability of mobile terminals in the channel congestion avoidance mode.

In the channel congestion avoidance mode, the control station selects a wireless base station for down channel based on the table of respective wireless base stations it manages and the handoff source of each mobile terminal. In the table of the wireless base station 22 it manages, a row containing the handoff source is searched to find a maximum value of the product "Pmn"*"Tn" of the moving direction probability "Pmn" and the normalized throughput value "Tn", and then a handoff destination wireless base station corresponding to its column is selected as a wireless base station for down channel. The control station performs this operation on each mobile terminal.

Figure 7:
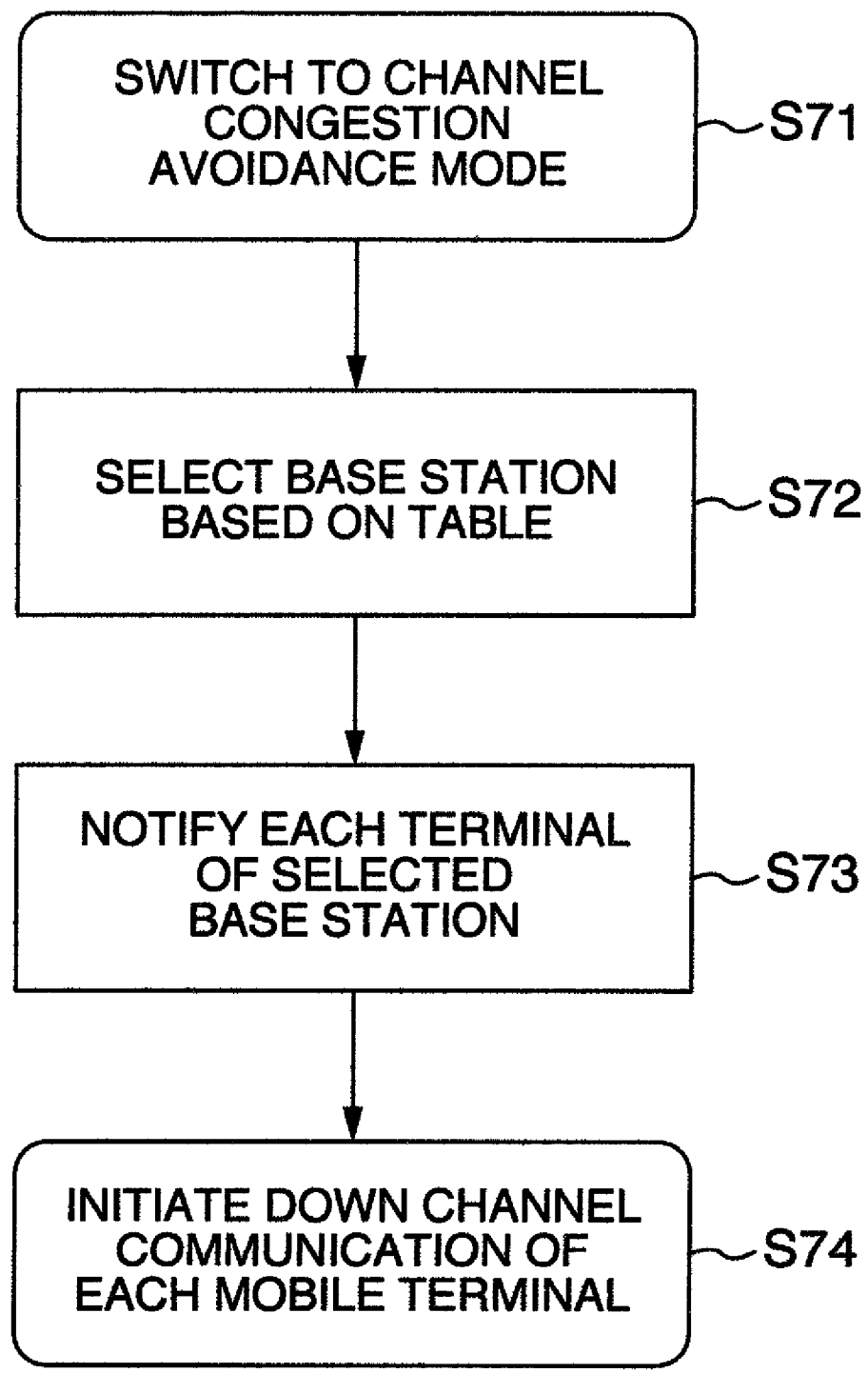
FIG. 7 is a flowchart showing the operation in a channel congestion avoidance mode.

FIG. 7 is a flowchart showing the operation in a channel congestion avoidance mode.

FIG. 7 shows a flowchart of the operation of the control station 10 in the channel congestion avoidance mode. First, the control station 10 switches to a channel congestion avoidance mode in step 71. For each mobile terminal located in the area of a wireless base station operating in the channel congestion avoidance mode and for each mobile terminal that have performed a handoff to the area of the wireless base station following the switching to the channel congestion avoidance mode, a wireless base station for down channel is selected based on the table of statistical processing results of moving direction probability and throughput values shown in FIG. 6 (step 72). The control station 10 notifies each mobile terminal via the wireless base station currently connecting to each mobile terminal of the selected wireless base station for down channel (step 73). Each mobile terminal notified of the selected wireless base station initiates the down channel data communication with the selected wireless base station (step 74).

As a means to notify each mobile terminal of the selected wireless base station, for example the Traffic Channel Assignment message (3GPP2 C. S0024-B Version 2.0, 9.6.2.2) in the Default Rout Update Protocol may be used, which is defined in a CDMA communication network. The Traffic Channel Assignment message (referred to as a TCA message) is used to transmit information on communication resources such as PN offset, DRC channel gain and channel number (frequency) from a wireless base station to a mobile terminal and to assign an up channel and a down channel to different wireless base stations. Upon receiving this message, the mobile terminal sends the Traffic Channel Complete message to the wireless base station and establishes up and down wireless channels by using the communication resource designated in the received TCA message.

Further, in the case where the channel congestion avoidance mode is canceled or where the mobile terminal moves to the area of another wireless base station, the normal channel connection control mode is switched back to and the channel is connected in a normal way.

As described above, the channel connection control method of this invention is characterized in that, in order to predict a time zone of channel congestion in a wireless base station and to avoid channel congestion in advance, the control station holds the throughput statistical data for respective wireless base stations and analyzes a past traffic trend of the respective wireless base stations to determine a wireless base station whose throughput is expected to be degraded by the congestion and to perform scheduling to automatically switch a channel connection control mode of the wireless base station to the channel congestion avoidance mode.

The channel connection control method is also characterized in that, in order to assign an appropriate wireless base station to each mobile terminal in the case where the control station avoids the channel congestion, the control station selects a wireless base station connecting to each mobile terminal, based on information on idle channels of surrounding wireless base stations and information on which surrounding wireless base stations each mobile terminal is likely to move to.

Further, the channel connection control method is characterized in that, to reduce the power consumption of mobile terminals, the only downward wireless channel of a mobile station is connected to another wireless base station while the mobile station keeps the upward wireless channel.

Further, in order to enable the method to be easily applied to the existing mobile communication system, switching scheduling to the channel congestion avoidance mode and selecting a wireless base station for down channel are all executed by the control station, and thus it is unnecessary that the existing wireless base stations and mobile terminals have an additional function.

In order to perform switching scheduling to a channel congestion avoidance mode, the control station holds throughput statistical data for every day of week and every time zone for a past predetermined period in respective wireless base stations. Further, for use in selecting an appropriate wireless base station for down channel for each mobile terminal, the control station accumulates statistical data of handoff sources and handoff destinations for a past predetermined period for each mobile terminal connected to respective wireless base stations, and, by analyzing the statistical data, holds information representing which surrounding wireless base station each mobile terminals are likely to move to.

Further, the control station analyzes the statistical data of accumulated throughput values. In the case where there is a trend that the throughput appears to degrade on a particular day of week or in a particular time zone, the control station registers the time zone on the day of week as a timing to switch to the channel congestion avoidance mode, and performs switching scheduling to the mode to avoid the channel congestion in advance.

Further, even on other than the day of week and in other than the time zone registered in the schedule, in the case where the throughput in the channel of a wireless base station is below a predetermined level, the control station switches to the channel congestion avoidance mode.

For a wireless base station in the channel congestion avoidance mode, the control station checks by comparing the handoff source history of each mobile terminal connected to the wireless base station with the moving direction characteristic of the wireless base station, and selects a wireless base station for down channel for each mobile terminal taking into consideration information on the idle channels of surrounding wireless base stations at the time of connection.

After selecting the wireless base station for down channel for each mobile terminal, the control station notifies each mobile terminal of the selected wireless base station via the wireless base station to which each mobile terminal is currently connected. The only downward wireless connection of each mobile terminal notified of the selected wireless base station is connected to the selected wireless base station while each mobile terminal keeps upward wireless connection, and the wireless communication is established.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for controlling wireless channel connection between mobile terminals and a plurality of wireless base stations, in a mobile communication system comprising the plurality of wireless base stations to communicate with the mobile terminals via wireless channels and a control station connecting to the plurality of wireless base stations to control the plurality of wireless base stations, wherein
the control station
regularly collects from the plurality of wireless base stations congestion information of the wireless channels in respective wireless base stations and movement information of mobile terminals;
prepares schedule information based on statistical processing results of the collected congestion information, the schedule information being used to switch a wireless channel connection control mode of respective wireless base stations; and,
in the case of controlling a wireless base station in a channel congestion avoidance mode according to the prepared schedule information, based on the congestion information of wireless base stations adjacent to the wireless base station and the movement information of the wireless base station, selects a wireless base station as a down channel connection destination from among the adjacent wireless base stations for each mobile terminal currently connected to the wireless base station and for each mobile terminal about to be connected to the wireless base station, notifies each mobile terminal of the selected wireless base station, and controls the wireless base station so that each mobile terminal is connected via a down channel to the selected wireless base station.

2. A wireless channel connection control method according to claim 1, wherein
the control station prepares the schedule information, by regularly collecting throughput information of the plurality of wireless base stations as the congestion information of the wireless channels and performing statistical processing on the collected throughput information for each day of week and for each time zone to determine the periodicity that the wireless channels in each of the plurality of the wireless base stations is congested.

3. A wireless channel connection control method according to claim 1, wherein
the movement information of mobile terminals in respective wireless base stations represents a handoff source wireless base station and a handoff destination wireless base station; and
the control station, based on the movement information, calculates for respective wireless base stations a probability that mobile terminals move to each of all wireless base stations adjacent to the wireless base station in order to determine movement characteristics of mobile terminals, and, based on the movement characteristics, selects a wireless base station to be notified to each mobile terminal.

4. A mobile communication system comprising a plurality of wireless base stations to communicate with mobile terminals via wireless channels and a control station connecting to the plurality of wireless base stations to control the plurality of wireless base stations, wherein
the control station
regularly collects from the plurality of wireless base stations congestion information of the wireless channels in respective wireless base stations and movement information of mobile terminals;
prepares schedule information based on statistical processing results of the collected congestion information, the schedule information being used to switch a wireless channel connection control mode of respective wireless base stations; and,
in the case of controlling a wireless base station in a channel congestion avoidance mode according to the prepared schedule information, based on the congestion information of wireless base stations adjacent to the wireless base station and the movement information of the wireless base station, selects a wireless base station as a down channel connection destination from among the adjacent wireless base stations for each mobile terminal currently connected to the wireless base station and for each mobile terminal about to be connected to the wireless base station, notifies each mobile terminal of the selected wireless base station, and controls the wireless base station so that each mobile terminal is connected via a down channel to the selected wireless base station.

5. A mobile communication system according to claim 4, wherein
the control station prepares the schedule information, by regularly collecting throughput information of the plurality of wireless base stations as the congestion information of the wireless channels and performing statistical processing on the collected throughput information for each day of week and for each time zone to determine the periodicity that the wireless channels in each of the plurality of the wireless base stations is congested.

6. A mobile communication system according to claim 4, wherein the movement information of mobile terminals in respective wireless base stations represents a handoff source wireless base station and a handoff destination wireless base station; and the control station, based on the movement information, calculates for respective wireless base stations a probability that mobile terminals move to each of all wireless base stations adjacent to the wireless base station in order to determine movement characteristics of mobile terminals, and, based on the movement characteristics, selects a wireless base station to be notified to each mobile terminal.

7. A control station in a mobile communication system comprising a plurality of wireless base stations to communicate with mobile terminals via wireless channels and a control station connecting to the plurality of wireless base stations to control the plurality of wireless base stations, wherein the control station regularly collects from the plurality of wireless base stations congestion information of the wireless channels in respective wireless base stations and movement information of mobile terminals;

prepares schedule information based on statistical processing results of the collected congestion information, the schedule information being used to switch a wireless channel connection control mode of respective wireless base stations; and, in the case of controlling a wireless base station in a channel congestion avoidance mode according to the prepared schedule information, based on the congestion information of wireless base stations adjacent to the wireless base station and the movement information of the wireless base station, selects a wireless base station as a down channel connection destination from among the adjacent wireless base stations for each mobile terminal currently connected to the wireless base station and for each mobile terminal about to be connected to the wireless base station, notifies each mobile terminal of the selected wireless base station, and controls the wireless base station so that each mobile terminal is connected via a down channel to the selected wireless base station.

8. A program embodied on a non-transitory computer readable medium for controlling wireless channel connection between mobile terminals and wireless base stations, comprising the steps of:

regularly collecting from wireless base stations congestion information of the wireless channels in respective wireless base stations and movement information of mobile terminals;

preparing schedule information based on statistical processing results of the collected congestion information, the schedule information being used to switch a wireless channel connection control mode of respective wireless base stations; and, in the case of controlling a wireless base station in a channel congestion avoidance mode according to the prepared schedule information, based on the congestion information of wireless base stations adjacent to the wireless base station and the movement information of the wireless base station, selecting a wireless base station as a down channel connection destination from among the adjacent wireless base stations for each mobile terminal currently connected to the wireless base station and for each mobile terminal about to be connected to the wireless base station, notifying each mobile terminal of the selected wireless base station, and controlling the wireless base station so that each mobile terminal is connected via a down channel to the selected wireless base station.

\* \* \* \* \*